Nov. 21, 1967    E. WALASCHEWSKI    3,353,997
PROCESS FOR REMOVING WASTE MATERIAL FROM
CHLOROSILANE SYNTHESIS REACTORS
Filed Aug. 10, 1964
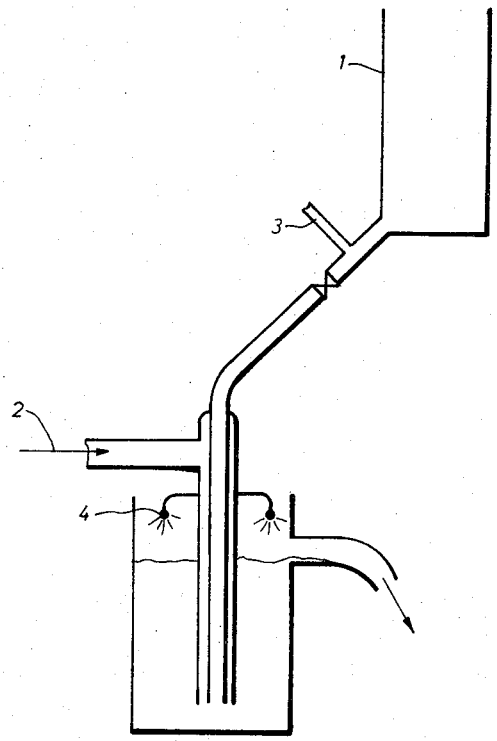
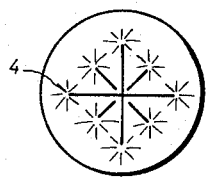
INVENTOR.
ENGELBERT WALASCHEWSKI
BY Burgess, Dinklage & Sprung
ATTORNEYS

United States Patent Office 3,353,997
Patented Nov. 21, 1967

3,353,997
PROCESS FOR REMOVING WASTE MATERIAL FROM CHLOROSILANE SYNTHESIS REACTORS
Engelbert Walaschewski, Cologne-Stammheim, Germany, assignor to Farbenfabriken Bayer Aktiengesellschaft, Leverkusen, Germany, a corporation of Germany
Filed Aug. 10, 1964, Ser. No. 388,500
Claims priority, application Germany, Aug. 6, 1963, F 40,428
1 Claim. (Cl. 134—22)

The invention relates to an improvement in the known syntheses of hydrocarbon-substituted chlorosilanes from alkyl- or aryl-chloride and silicon powder, carried out at temperatures from 200 to 600° C. in the presence of metal catalysts.

In this process it is known to be impossible to utilise the silicon employed completely, since the powder gradually becomes covered with carbon so that finally only undesired side-products are formed or the reaction is altogether suppressed. Although it can be restarted by introducing fresh silicon powder, this does not obviate the need to remove from time to time accumulated ineffective powder from the reaction chamber.

The material to be removed then has extremely inconvenient properties: in the hot state, brought into contact with air, it immediately inflames. Consequently the process had to be interrupted and the reactor cooled before being emptied. However, the difficulties were still not overcome in this way, since by virtue of its fineness, of usually less than 20 micron particle size, the waste powder tends to very troublesome dust-formation. The obvious measure against this, i.e. to bind the dust with water, is ruled out on two counts. The powder is wetted only insignificantly or not at all by the water even with addition of wetting agents. Furthermore, the material permits spontaneous inflammation when moistened with the smallest amounts of water and exposed to spontaneous drying, so that it is impossible to store this waste material in the open air on dumps. The consequence would be, apart from the dust nuisance, combustion in the dump, by which unpleasant-smelling, hydrogen chloride-containing gases are developed and which cannot be controlled even after slight spreading.

The removal of waste from the reactor has thus been associated with considerable expense on account of the precaution required. After interrupting the synthesis process and cooling of the contents of the reactor, the latter must be sluiced out under a protective gas and immediately trapped in tight, moisture-excluding vessels. For this purpose rather stable and thus relatively expensive drums or tanks must be employed, because the waste powder contains chemically bound chlorine—usually 1 to 5 percent by weight—so that the risk of corrosion does not permit the use of thin-walled iron vessels. The powder itself has only small value in spite of its copper content, since subsequent oxidation for rendering it innocuous necessitates still further commercial expense on account of its dangerous properties.

A process has now been found by which all the aforesaid disadvantages are avoided. The invention is based on the discovery that the waste powder may be wetted by water in the hot state and does not thereby develop hydrogen, if it is brought into contact quickly enough with a sufficiently great amount of water. This behaviour which is surprising according to experience with the cooled waste material leads to a slurry which, even after drying in the open air, can be handled without danger.

The new process for removing waste material from organochlorosilane synthesis reactors operated with chlorohydrocarbon and silicon powder, is accomplished by blowing those contents of the reactor which have become unusable, before entry of air, into a container filled with water and agitated, while maintaining the operation temperature, optionally also using an inert gas, the surface of the contents of the container being additionally showered at the same time from a number of nozzles with water. The latter measure serves to produce the complete wetting of each particle of the waste powder, which may have remained insufficiently moistened by the main treatment and floats on the surface. The blowing out is favoured by the superatmospheric pressure under which the inside of the synthesis reactor is normally kept, so that it contents can be passed through pipes of any length. The slurry formed by the treatment with water according to the invention can be disposed of without objection by putting it into a pit.

The invention thus offers a number of advantages, in that it not only makes possible a simple and safe removal of the waste, but as a consequence also favourably influences the synthesis process from a commercial viewpoint. Thanks to the small expense, the furnace contents can be frequently discharged, and thus a higher proportion of the valuable diorgano-dichloro-silanes is achieved in the products of synthesis. Apart from this increase in material yield, an improved yield in space and time of the plant is obtained, since immediately after the discharge, the furnace can be charged with fresh silicon and the synthesis process continued. By dispensing with the cooling and reheating, energy is saved and the furnace structure is spared, which suffers considerably from the stress of temperature changes.

The following example is given for the purpose of illustrating the invention.

EXAMPLE

In a cylindrical reactor (1) of 20 cm. width, at about 500° C., the synthesis of phenylchlorosilanes from chlorobenzene and silicon is carried out in the presence of copper as catalyst, for a prolonged period of time with several replenishments of silicon powder. Finally there are in the reactor about 30 kg. of silicon which is no longer reactive and contains about 5 percent by weight copper and 30 percent by weight carbon. While maintaining the excess pressure of 0.2 atmosphere in the reactor, the contents of the reactor are conducted, in the course of 10 minutes, into a stream of water (2) of 3 to 6 m.³/h. At the same time a weak current of nitrogen is blown in (3) to prevent blockage of the outlet pipe, care being taken that an intensive irrigation of surface residues possibly remaining unwetted is ensured by showers (4) arranged above the open water surface. (Compare the accompanying drawing.)

This process leads to an increase of the space-time yield by approximately 25%, and to a rise in the proportion of diphenyl-dichlorosilane to phenyl-trichlorosilane of about 20%.

What I claim is:

In a process for the removal of waste material from organochlorosilane synthesis reactors operated with chlorohydrocarbon and silicon powder, the improvement which comprises blowing the contents of the reactor which have become unusable, before entry of air, into a container filled with water and agitated, while maintaining the operating temperature, the surface of the contents of the container being additionally and simultaneously sprayed with water from a number of nozzles.

References Cited

UNITED STATES PATENTS

| 118,211 | 8/1871 | Deacon | 134—37 X |
|---|---|---|---|
| 502,181 | 7/1893 | Fauvel | 134—25 X |
| 1,678,089 | 7/1928 | Ullmann | 134—22 |
| 2,007,799 | 7/1935 | Gloersen | 134—10 X |
| 2,395,079 | 2/1946 | Sparks et al. | 134—25 X |
| 2,480,727 | 8/1949 | Greyson | 134—25 X |
| 2,803,521 | 8/1957 | Nitzsche et al. | 206—448.2 |
| 2,966,431 | 12/1960 | Lorenz et al. | 134—39 X |

JOSEPH SCOVRONEK, *Primary Examiner.*

J. ZATARGA, *Assistant Examiner.*